(12) United States Patent
Jung et al.

(10) Patent No.: US 6,509,541 B2
(45) Date of Patent: Jan. 21, 2003

(54) METHOD FOR MOLDING AN ASSEMBLY PANEL

(75) Inventors: Ha-Young Jung, Ulsan (KR); Heung-Chun Ahn, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/971,612

(22) Filed: Oct. 9, 2001

(65) Prior Publication Data

US 2002/0041050 A1 Apr. 11, 2002

(30) Foreign Application Priority Data

Oct. 9, 2000 (KR) .......................................... 00-59123

(51) Int. Cl.[7] .............................................. B23K 11/10
(52) U.S. Cl. ................... 219/91.2; 228/160; 228/173.2; 228/173.6; 72/363; 72/379.2
(58) Field of Search .......................... 219/80, 86.1, 87, 219/91.2; 72/363, 379.2; 228/159, 160, 170, 173.1, 173.2, 173.6

(56) References Cited

U.S. PATENT DOCUMENTS

| | | | | |
|---|---|---|---|---|
| 4,082,578 A | * | 4/1978 | Evancho et al. ............. | 148/535 |
| 4,369,010 A | * | 1/1983 | Ichinose et al. ............. | 410/101 |
| 4,618,181 A | * | 10/1986 | Tokuda et al. .............. | 219/91.2 |
| 4,634,174 A | * | 1/1987 | Kamiya ....................... | 296/195 |
| 4,969,680 A | * | 11/1990 | Shimoda .................... | 296/146.6 |
| 5,237,734 A | * | 8/1993 | Polon ....................... | 29/243.58 |
| 5,374,799 A | * | 12/1994 | Nishimoto et al. ....... | 219/117.1 |
| 5,487,219 A | * | 1/1996 | Ruehl et al. ............... | 29/465 |
| 5,605,353 A | * | 2/1997 | Moss et al. ................. | 188/376 |
| 5,958,603 A | * | 9/1999 | Ragland et al. ............ | 428/595 |
| 5,975,623 A | * | 11/1999 | Shikimachi et al. ........ | 296/189 |
| 6,029,334 A | * | 2/2000 | Hartley ........................ | 29/464 |
| 6,073,992 A | * | 6/2000 | Yamauchi et al. .......... | 296/188 |
| 6,241,307 B1 | * | 6/2001 | Kim ........................... | 296/106 |
| 6,276,044 B1 | * | 8/2001 | Ragland et al. ............. | 29/521 |

OTHER PUBLICATIONS

US 2001/0039712 A1 Ruehl et al. (Nov. 15, 2001).*
US 2002/0041050 A1 Jung et al. (Apr. 11, 2002).*
US 2002/0046505 A1 Seksaria et al. (Apr. 25, 2002).*

* cited by examiner

Primary Examiner—M. Alexandra Elve
Assistant Examiner—Kiley Stoner
(74) Attorney, Agent, or Firm—Birch, Stewart, Kolasch & Birch, LLP

(57) ABSTRACT

The present invention provides a method for molding an assembly panel by manufacturing a blank for a main panel and a blank for a reinforcing panel; temporarily welding the blank for the reinforcing panel to the blank for the main panel along a predetermined welding line; holding the two welded panels in a press and molding the same into a predetermined shape; trimming scraps from the main panel; and spot welding the two panels so that the two panels adhere to each other more firmly.

3 Claims, 2 Drawing Sheets

METHOD FOR MOLDING AN ASSEMBLY PANEL

CROSS-REFERENCE TO RELATED APPLICATION

This application claims priority of Korea patent Application No. 10-2000-0059123, filed on Oct. 09, 2000.

BACKGROUND OF THE INVENTION (a) Field of the Invention

The present invention relates to a method for molding an assembly panel, and more particularly, to a method for temporarily welding a blank for a main panel and a blank for a reinforcing panel together, and molding the two welded blanks simultaneously.

(b) Description of the Related Art

Generally, to enhance rigidity of a certain part of a vehicle body, an assembly panel that is made by attaching a reinforcing panel over a main panel is used. In a conventional method for molding such an assembly panel, as shown in FIG. 4, a main panel 53 and a reinforcing panel 57 are individually molded from blanks 51 and 55 respectively in different molding processes, respective scraps 59 and 61 are individually trimmed from the panels 53 and 57, and then by spot-welding the reinforcing panel to the main panel, the assembly panel 63 is formed.

However, in a method for molding the assembly panel according to the prior art, because the reinforcing panel and the main panel are molded individually they have different dimensions, and therefore many processes are needed to form a panel with high precision. Furthermore, too many scraps are generated because the two panels are individually molded.

SUMMARY OF THE INVENTION

Therefore, the present invention relates to a method to solve the above problems.

In a method for molding an assembly panel according to the present invention, a blank for a main panel and a blank for a reinforcing panel are temporarily welded together, and then the two blanks are molded simultaneously such that a number of steps of the molding process and unnecessary scrap can be decreased, and interference between the two panels and torsion owing to dimensional aberrations can be minimized.

To achieve the above objects, the method for molding the assembly panel according to the present invention comprises the steps of:

manufacturing a blank for a main panel and a blank for a reinforcing panel;

temporarily welding the blank for the reinforcing panel to the blank for the main panel along a predetermined welding line;

holding the two welded blanks in a press and molding the same into a predetermined shape;

trimming scraps from the main panel; and spot-welding the two panels so that they adhere to each other more firmly.

Moreover, in manufacturing the two blanks, the present invention further comprises a step of boring several tooling holes through each panel, the tooling holes being needed for blank location on the welding jig. In addition, the welding line is preferably located in a center part of the two patch blanks where tensile and contractile forces are small.

DETAILED DESCRIPTION OF THE PREFERRED EMBODIMENTS

Hereinafter, a preferred embodiment of the present invention will be described in detail with reference to the accompanying drawings.

Figure 1:
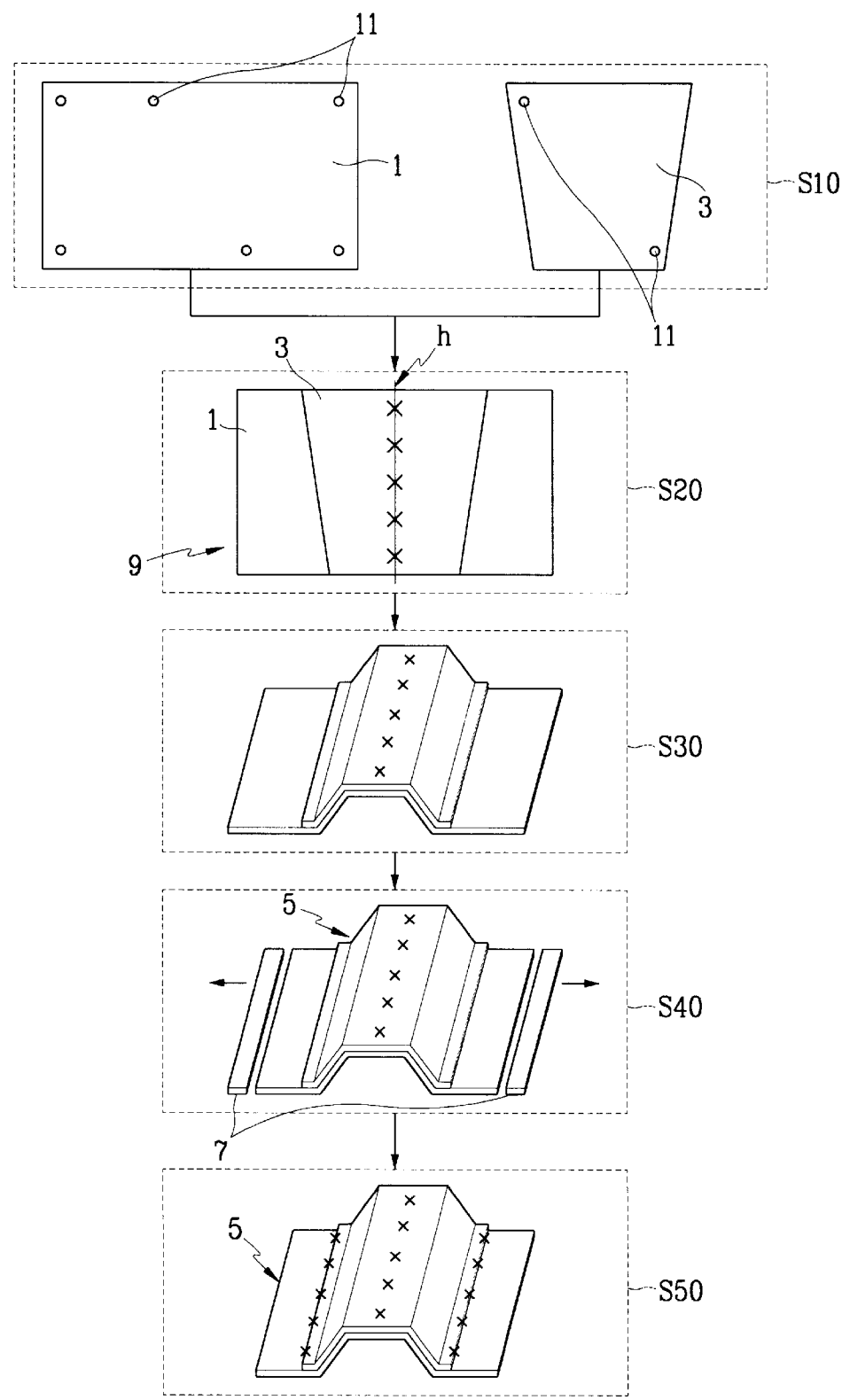
FIG. 1 is a drawing showing a process of an assembly panel molding method according to the present invention.

FIG. 1 is a block diagram showing a process of an assembly panel molding method according to the present invention.

First, a blank 1 for a main panel and a blank 3 for a reinforcing panel are respectively manufactured on an exclusive blanking table (S10).

At this time, the blank 3 for the reinforcing panel should be manufactured to such an accurate size that it will generate no scrap in the molding process. Also, several tooling holes 11 are bored through each panel, the tooling holes being needed for blank location on a welding jig.

The two blanks 1 and 3 are then located on the welding jig by means of the tooling holes, and they are temporarily welded along a welding line 'h' (S20). They are then held in a press and molded into a predetermined shape (S30).

Figure 2:
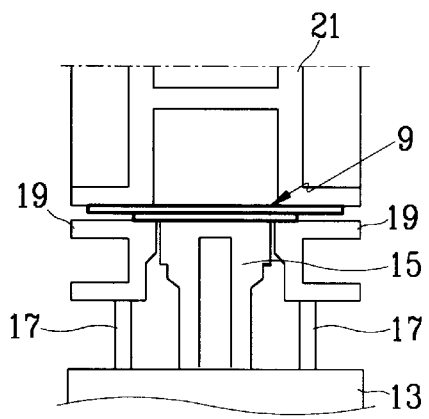
FIG. 2 schematically shows the first step of a molding process by a press according to the present invention.
Figure 3:
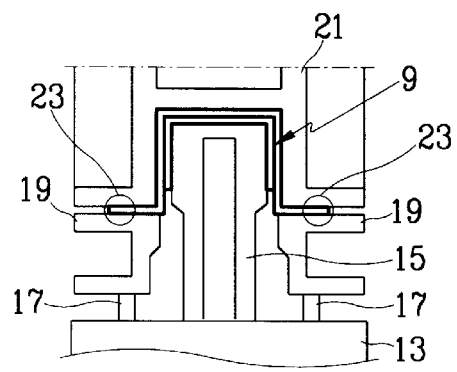
FIG. 3 schematically shows the second step of a molding process by a press according to the present invention.
Figure 4:
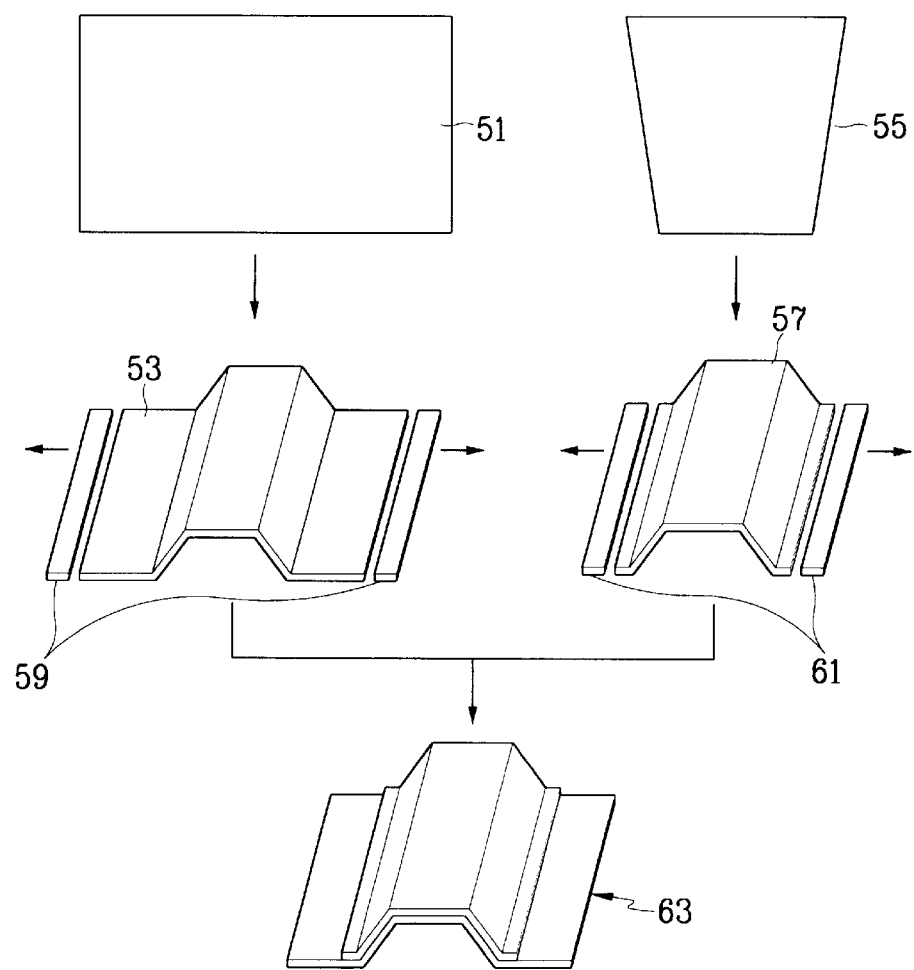
FIG. 4 is a block diagram showing a process of an assembly panel molding method according to the prior art.

FIGS. 2 and 3 respectively show the first and second step of the molding process by a press according to the present invention.

First, the two blanks 9 that are temporarily welded are held in the press, the press comprising a lower die 15 fixed to a base 13, a blank holder 19 moving vertically by a cushion pin 17, the blank holder being located outside of the lower die 15, and an upper die 21 moving up and down.

The two blanks 9 are held between the upper die and the blank holder, and then if the upper die 21 is operated to move downward, the two blanks are molded into a predetermined shape.

It is preferable that the welding line is in accord with a center-line of the two patch blanks so that tensile and contractile forces are small when the two blanks are molded.

During the molding process, edges 23 of the assembly panel 5 are tightly held between the upper die 21 and the blank holder 19, and they are damaged. Therefore, the assembly panel 5 has scraps 7, and they are cut off (S40).

The assembly panel 5 produced in step S40 is then spot-welded on the welding jig such that the two panels adhere to each other more firmly.

As stated above, in the method for molding the assembly panel according to the present invention, the main panel and the reinforcing panel are simultaneously molded, and thereby the number of steps in the molding process of the assembly panel can be reduced. Furthermore, because damage only occurs to the maid panel, unnecessary scrap can be decreased.

In addition, because the two panels are not separately molded, interference between the two panels and torsion owing to dimensional aberration can be minimized.

What is claimed is:

1. A method for molding an assembly panel comprising:
   (a) manufacturing a blank for a main panel and a blank for a reinforcing panel;
   (b) temporarily welding the blank for the reinforcing panel to the blank for the main panel along a predetermined welding line;
   (c) holding the two welded panels in a press and molding the same into a predetermined shape;
   (d) trimming scraps from the main panel; and
   (e) spot-welding the two panels so that the two panels adhere to each other more firmly.

2. The method of claim 1 wherein step (a) further comprises a step of boring several tooling holes through each panel, the tooling holes being needed for blank location on a jig.

3. The method of claim 1 wherein the welding line is in accord with a center-line of the two blanks where a tensile force and a contractile force are small.

* * * * *